C. G. & V. R. WITTMANN.
TROLLEY WHEEL GUARD.
APPLICATION FILED FEB. 27, 1911.
1,043,994.
Patented Nov. 12, 1912.
2 SHEETS—SHEET 2.
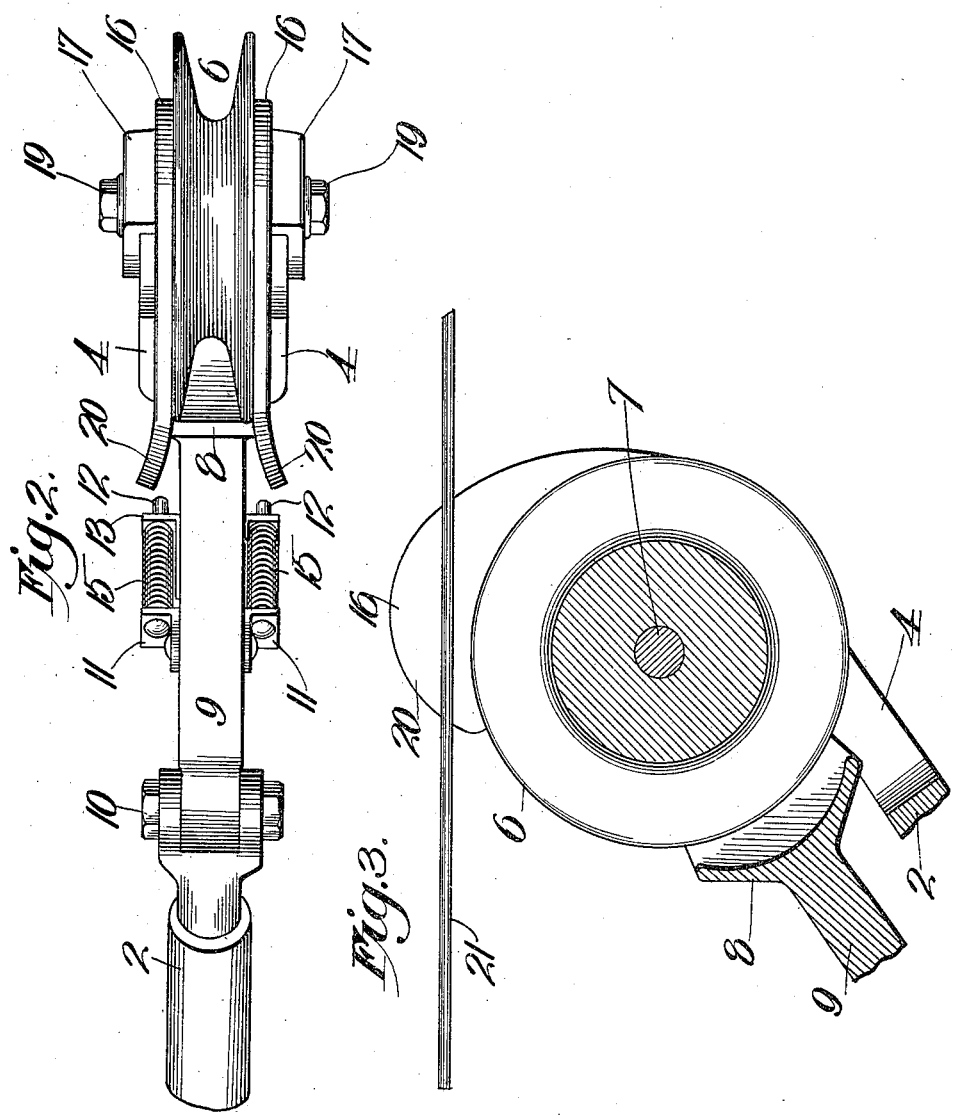
Witnesses
Frank R. Hon
H. C. Rodgers
Inventors:
C. G. Wittmann and V. R. Wittmann
By George H. Thorpe Atty.

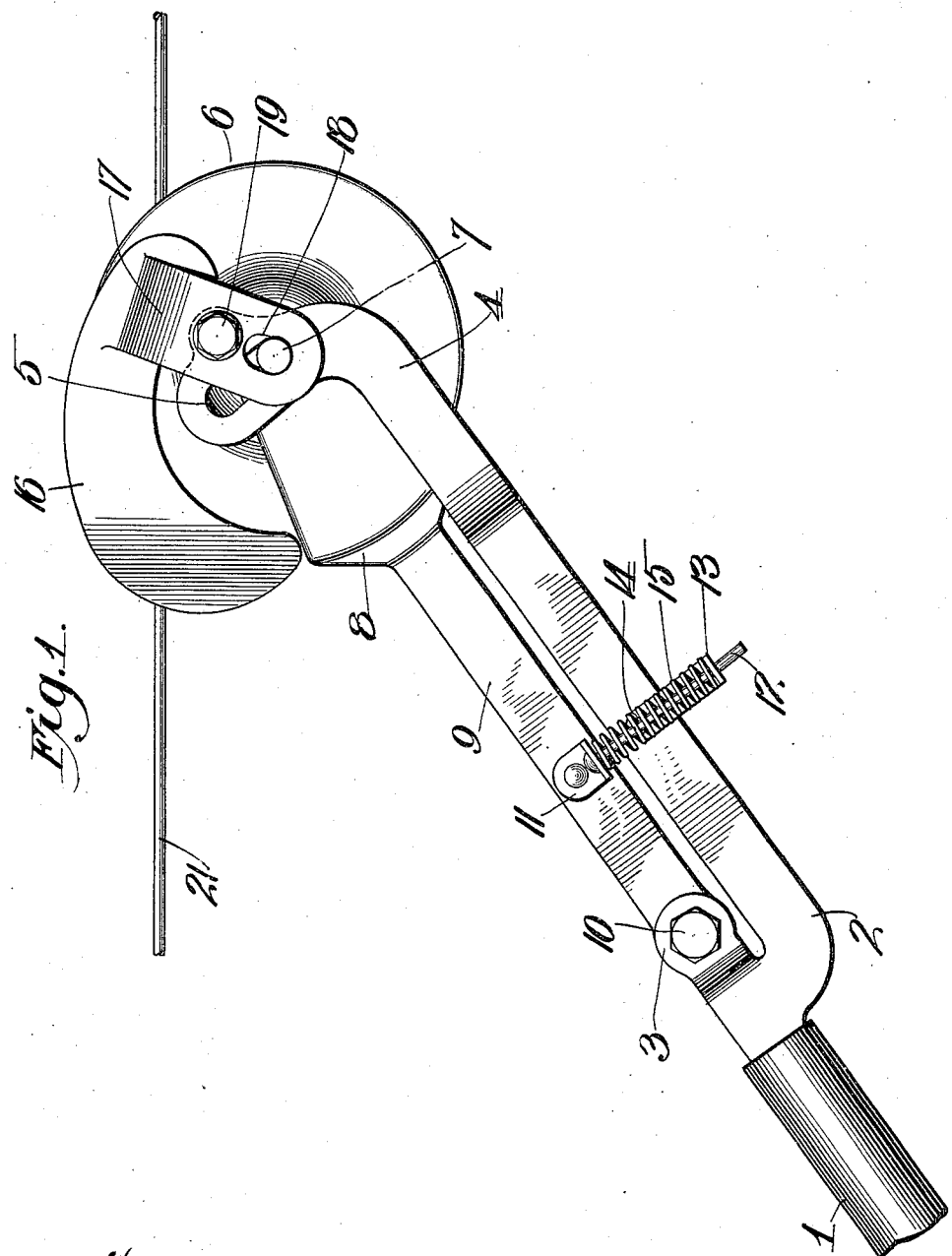

UNITED STATES PATENT OFFICE.

CHARLES G. WITTMANN AND VICTOR R. WITTMANN, OF INDEPENDENCE, MISSOURI.

TROLLEY-WHEEL GUARD.

1,043,994.   Specification of Letters Patent.   Patented Nov. 12, 1912.

Application filed February 27, 1911. Serial No. 611,306.

*To all whom it may concern:*

Be it known that we, CHARLES G. WITTMANN and VICTOR R. WITTMANN, citizens of the United States, residing at Independence, in the county of Jackson and State of Missouri, have invented certain new and useful Improvements in Trolley-Wheel Guards, of which the following is a specification.

This invention relates to trolley guards and has for its object the production of a device of this character which will automatically take up or accommodate ordinary vibrations of the trolley pole and reliably retain the trolley wheel in operative relation to the trolley wire.

A further object is to produce a device of this character of simple, strong, durable and cheap construction.

With these general objects in view the invention consists in certain novel and peculiar features of construction and organization as hereinafter described and claimed; and in order that it may be fully understood reference is to be had to the accompanying drawings, in which—

Figure 1, is a side view of a part of a trolley pole equipped with a guard embodying our invention, the view showing the trolley wire engaged by the trolley wheel and the guard attachment in normal or inoperative position. Fig. 2, is a top view. Fig. 3, is a central vertical section with the trolley wheel depressed and the guard in elevated or operative position.

Referring now to the drawings in detail, 1 indicates the upper end of a trolley pole and 2 an offsetting extension thereof, the extension being preferably secured in any suitable manner to the pole and provided at its lower end in line with the pole with perforated ears 3 and at its upper end with a fork 4, each arm of the fork being of substantially right-angle form in side view and provided with a slot 5, extending transversely with respect to the pole, the slots extending concentrically with respect to the perforated ears 3.

6 indicates a trolley wheel arranged in the forked end of the extension 2, with the ends of its shaft or spindle 7 projecting through the slots 5, so as to be capable of play therein.

8 indicates a harp standing normally within said fork and receiving the trolley wheel and forming a journal for the shaft or spindle thereof. The harp is provided with a stem or shank 9 fitting between and pivoted to the ears 3 by means of a bolt 10.

11 indicates a pair of brackets pivoted to opposite sides of the stem or shank 9 and 12 headed pins extending through said brackets and arranged at opposite sides of the extension 2, and also extending slidingly through angle brackets 13 pivoted to said extension at 14, and surrounding said pins and bearing at their opposite ends against brackets 11 and 13 are coiled springs 15, the pressure of said spring being weaker than that of the ordinary spring (not shown) by which the pole is raised to hold the trolley wheel against the wire so that the shaft or spindle of the wheel shall normally occupy the rear or lower ends of slots 5, as shown.

A guard to prevent accidental disengagement of the wheel from the trolley wire consists of a pair of parallel plates 16 of arch shape in side view and arranged at opposite sides of and close to wheel 6, the said plates being each provided with an angle arm 17 extending downward at the outer sides of the adjacent arms of fork 4 and provided with slots 18 receiving the ends of the shaft or spindle 7, and pivotally connecting said arms to the arms of the fork are bolts 19, and the front end of the guard constituted by plates 16, is preferably flared as at 20.

21 indicates the trolley wire for engagement with the wheel in the usual manner.

In operation the pressure of the spring which elevates the pole holds the trolley wheel as customary against the trolley wire, and hence normally maintains the shaft or spindle at the rear or lower ends of slots 5 as hereinbefore stated, the rearward pressure of the shaft or spindle on the arms 17 holding the guard in the position shown in Fig. 1, that is depressed so that the guard shall project little if any above the wheel. In the event that the trolley pole through the vibration or movement of the car or from any other cause, swings downward and thus tends to withdraw the trolley wheel from engagement with the wire, the springs 15 compensate for or take up such vibrations by swinging the harp forwardly and upwardly and therefore causing the shaft or spindle of the wheel to move in the direction indicated in slots 5, the relative length of the pole and harp stem or shank being such that the response of the latter to the pressure of the springs 15 is so rapid that the wheel will seldom move downward from the wire under downward movement of the pole, though of course it may be caused to move in such direction by contact with a lump, such as of ice, on the wire.

In the relative upward movement of the wheel, the pressure of the shaft or spindle on the front walls of the slots 18, tend to swing the plates constituting the guard upward to substantially the position shown in Fig. 3, so as to in effect materially deepen the peripheral channel of the wheel at the point thereon through which the wire extends so as to guard against sufficient lateral movement of the pole to throw the wheel from under the wire. When this movement of the guard takes place, it will be accelerated should the pole swing laterally at the same time, as in such event one of the guard plates will come into frictional contact with the side of the wire and under such friction be forced rearwardly and upwardly as will be readily seen.

As the pole vibrates upwardly, the resistance offered by the wire to further upward movement of the wheel results in the compression of springs 15 and the restoration of the parts to their initial positions as shown in Fig. 1.

It will be apparent that owing to the curvature of the plates of the guard, that contact thereof with a relatively unyielding cross wire will result in a slight depression of the pole so that the guard shall ride under and beyond the obstruction without injury to either.

From the above description it will be apparent that we have produced an automatic guard for retaining a trolley wheel in operative relation to a trolley wire efficiently and reliably, which can be easily and cheaply applied to an ordinary trolley pole and which embodies features of advantage enumerated as desirable and which obviously may be modified without departing from the spirit and scope of the appended claim.

We claim:—

The combination with a trolley pole having an offsetting extension 2, terminating at its upper end in a fork having upturned ends provided with longitudinal slots 5, a harp extending within the forked end of the extension and pivoted at its lower end to said extension in line with the trolley pole, and adapted for movement in a vertical plane, yielding means tending to swing the harp upwardly with respect to said extension, a spindle journaled in and extending through the harp and the slots of said extension, a wheel secured on the spindle within the harp, and a guard consisting of two arch-shaped plates at opposite sides of the wheel provided at their rear ends and outer sides with outwardly and downwardly extending angle arms 17 fitting against the outer sides of the upwardly-projecting slotted arms of the said extension and provided with longitudinal slots receiving the extremities of the said spindle, and pivoted above said spindle to the said upwardly projecting arms of the extension; said plates projecting at all times beyond the upper side of the wheel.

In testimony whereof we affix our signatures in the presence of two witnesses.

CHARLES G. WITTMANN.
VICTOR R. WITTMANN.

Witnesses:
 HELEN C. RODGERS,
 G. Y. THORPE.

---

Copies of this patent may be obtained for five cents each, by addressing the "Commissioner of Patents, Washington, D. C."